United States Patent [19]
Bassett

[11] Patent Number: 5,479,868
[45] Date of Patent: Jan. 2, 1996

[54] WHEELS HUB MOUNT

[75] Inventor: James H. Bassett, Sycamore, Ill.

[73] Assignee: Dawn Equipment Co., Sycamore, Ill.

[21] Appl. No.: 73,574

[22] Filed: Jun. 8, 1993

[51] Int. Cl.[6] ........................................ A01C 5/06
[52] U.S. Cl. ........................ 111/139; 111/140; 172/540; 172/681; 301/111
[58] Field of Search ........................... 403/13, 14, 22; 301/111, 114; 111/139, 140, 157, 163, 144; 172/540, 681

[56] References Cited

U.S. PATENT DOCUMENTS

| | | | |
|---|---|---|---|
| 2,960,358 | 11/1960 | Christison | 403/14 |
| 3,718,191 | 2/1973 | Williams | 111/140 X |
| 4,225,191 | 9/1980 | Knoski | 403/13 X |
| 4,295,532 | 10/1981 | Williams et al. | 172/184 |
| 4,779,684 | 10/1988 | Schultz | 172/575 X |
| 5,076,180 | 12/1991 | Schneider | 111/139 |
| 5,255,617 | 10/1993 | Williams et al. | 111/140 |

Primary Examiner—Randolph A. Reese
Assistant Examiner—Robert Pezzuto
Attorney, Agent, or Firm—Wood, Phillips, VanSanten, Clark & Mortimer

[57] ABSTRACT

A hub assembly for supporting a member for rotation relative to a frame. The hub assembly has a support for a member to be rotated about a first axis relative to a frame and a fixed hub part. First structure is provided for connecting the support to the fixed hub part for rotation about a first axis. Second structure is provided for connecting the fixed hub part to a frame relative to which the member is to be rotated. The second structure includes a first surface on the fixed hub part to abut a frame surface and a pin on one of the frame and the fixed hub part to project into a first bore on the other of a frame and the fixed hub part. The pin and bore are offset from the first axis. There is a third structure for drawing the first surface on a fixed hub part against a frame surface.

20 Claims, 3 Drawing Sheets

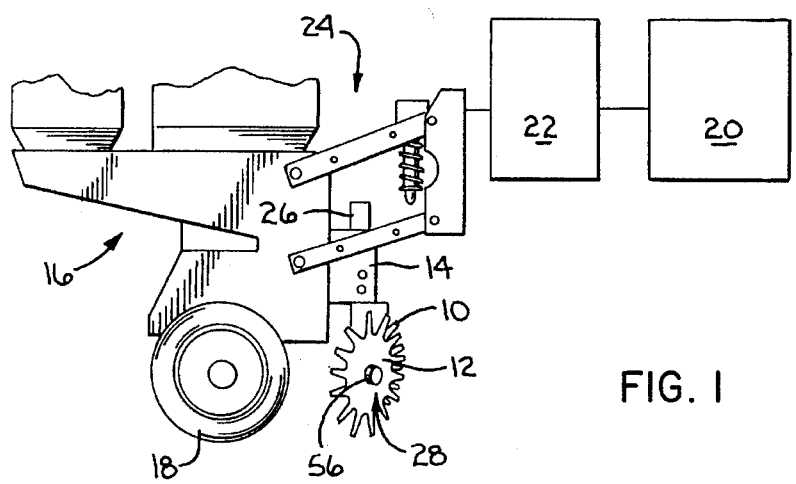
FIG. 1
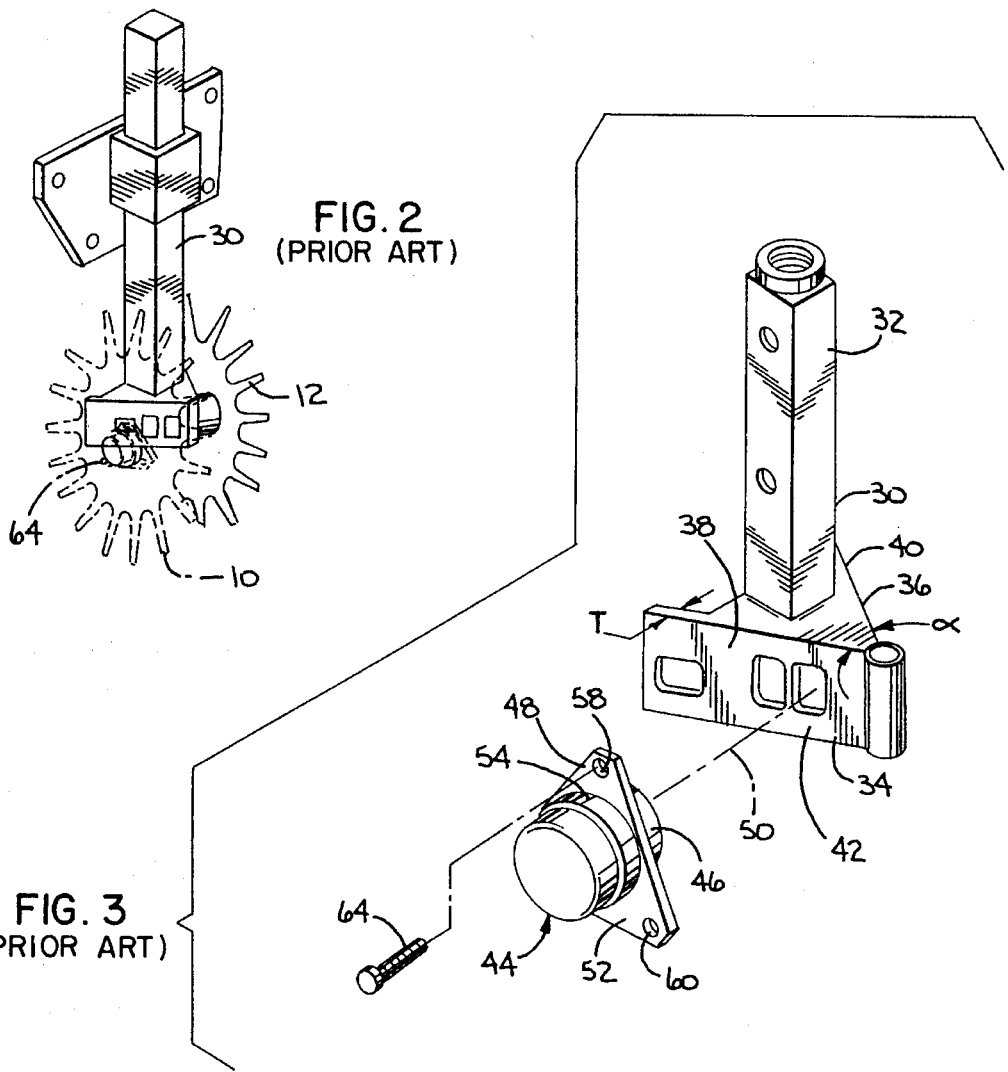
FIG. 2 (PRIOR ART)
FIG. 3 (PRIOR ART)

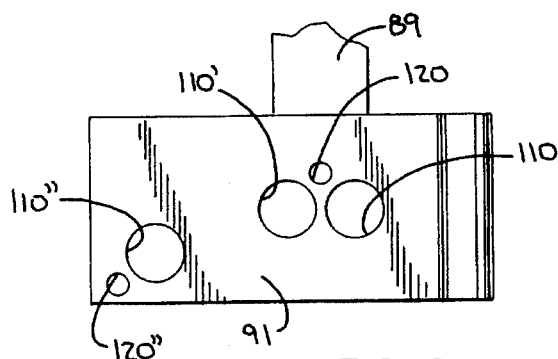
FIG. 8
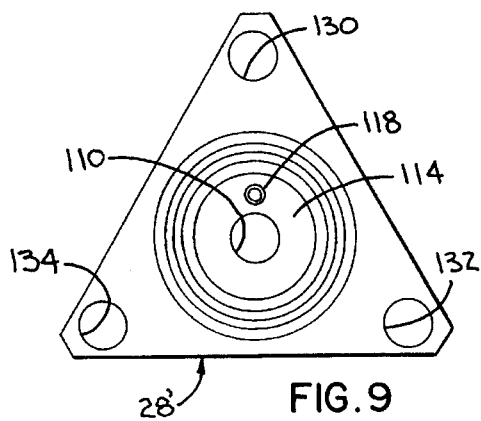
FIG. 9
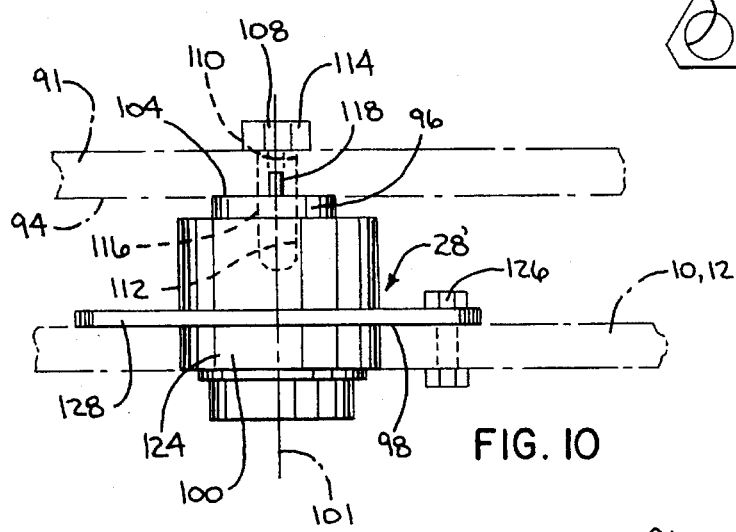
FIG. 10
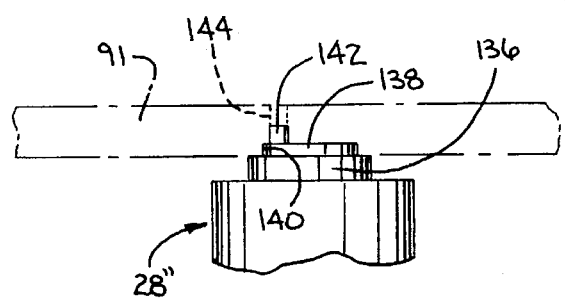
FIG. 11
FIG. 12
FIG. 13

WHEELS HUB MOUNT

BACKGROUND OF THE INVENTION

1. Field of the Invention

This invention relates to hubs upon which wheels are mounted for rotation and, more particularly, to structure for mounting a hub to a support therefor.

2. Background Art

There are many environments in which wheel-carrying hubs are required to be rigidly mounted upon a supporting frame. One such environment is in the agricultural industry. In some agricultural equipment, a large number of soil working implements/wheels are mounted upon a frame to be simultaneously drawn through a field by a towing vehicle. One such style of implement is currently being sold by the assignee herein under the trademark TRASHWHEEL™.

The TRASHWHEEL™ implements are mounted upon a frame to rotate about transverse axes relative to the frame. Rotation is imparted to the TRASHWHEEL™ implements by the soil through which they are drawn. The plane of rotation of each of the TRASHWHEEL™ implements is non-parallel to the direction of travel of the towing vehicle. This allows the TRASHWHEEL™ implements to be arranged in meshing pairs that work the soil with a scissors action.

As a result of this mounting arrangement, there is a tremendous force exerted on the supporting hubs for the wheels/implements, tending to rotate the fixed portion of the hubs relative to the frame to which it attaches. Consequently, designers of such equipment must engineer the hub mounting structure to both prevent rotation of the fixed hub portion relative to the frame and separation of the fixed hub portion from the frame.

One known mounting structure requires a thick plate on the frame and uses a bolt to secure the fixed hub part to the plate. To rigidify the connection between the fixed hub part and plate, the fixed hub part is provided with a boss that extends fully through the plate. The surface bounding the plate bore and boss outer surface are keyed to prevent relative rotation between the fixed hub part and plate. A bolt is directed inside out into the fixed hub part to maintain the boss within the plate bore.

The plate bore and boss outer surface can have any non-circular shape to key the boss in the plate bore. For example, one or more flats can be provided on the boss to make this keyed connection. The boss surface could be, for example, V-shaped, rectangular, or the like.

The difficulty with creating a non-circular bore is that the bore cannot be drilled. Instead, the non-circular bore is typically formed by a stamping process.

The stamping process has some inherent drawbacks. First of all, it is a more expensive process to perform than drilling. Secondly, stamping places a restriction on the permissible thickness of the plate. For example, it is not practical to stamp plate material as thick as ½ inch. Consequently, the need to stamp the plate builds in an inherent limitation on the permissible plate thickness. Whereas a ½ inch thick frame plate may be desirable in the agricultural environment, it is not possible to use such a thick plate to mount a hub using conventional techniques.

A further problem with the conventional stamping operation is that a relatively large effective diameter bore and boss are required. Since the outer surface of the boss is responsible for preventing rotation of the fixed hub part relative to the frame, the effective diameter of this surface must be relatively large to prevent stripping of the outer surface or shearing of the boss. As a consequence, the large bore in the plate may significantly weaken the plate. This problem is aggravated by the fact that the plate thickness is limited if the stamping process is required. Also, in the agricultural environment, it is desirable to be able to mount the hub selectively in a plurality of different positions on the plate, thereby requiring multiple bores. The multiple bores further weaken the frame plate.

SUMMARY OF THE INVENTION

The present invention is specifically directed to overcoming the above enumerated problems in a novel and simple manner.

In one form of the invention, a hub assembly is provided for supporting a member for rotation relative to a frame. The hub assembly has a support for a member to be rotated about a first axis relative to a frame and a fixed hub part. First structure is provided for connecting the support to the fixed hub part for rotation about a first axis. Second structure is provided for connecting the fixed hub part to a frame relative to which the member is to be rotated. The second structure includes a first surface on the fixed hub part to abut a frame surface and a pin on one of a frame and the fixed hub part to project into a first bore on the other of a frame and the fixed hub part. The pin and bore are offset from the first axis. There is a third structure for drawing the first surface on the fixed hub part against a frame surface.

With the inventive structure, relative rotation between the fixed hub part and a frame can be resisted by the pin. This obviates the need to provide a more complicated keying structure, such as that used in the prior art.

In one form, the first surface on the fixed hub part faces axially in a first direction relative to the first axis and the pin is on the fixed hub part and projects axially in the first direction beyond the first surface on the fixed hub part.

The third structure can take a number of different forms. For example, a bolt can be directed through a frame and into the hub assembly so that a frame is captive between the bolt head and the first surface on the fixed hub part.

The invention also contemplates the hub assembly in combination with a frame having a plate to which the fixed hub part is abutted with the hub assembly in its operative position.

In one form, the first bore is in the frame plate and there is a second bore in the frame plate spaced from the first bore to accommodate the bolt, or other fastener. The invention can be practiced without having to make other than a circular bore in the frame plate. Thus, the bores can be drilled, which allows for the thicker plate stock to be employed. At the same time, manufacturing costs can be reduced by eliminating stamping or more complicated bore forming processes.

In one form, the plate has a flat, axially facing surface to which the first surface on the fixed hub part abuts with the hub assembly in its operative position on the frame and no part other than the pin extends into the frame plate.

Additional stability can be provided to the hub assembly by providing a boss on the fixed hub part that is separate from the pin. The boss can extend partially into or fully through the frame plate. The bore accommodating the boss can be either circular or non-circular, with the latter affording a redundant keying connection with the pin.

The fixed hub part can be connectable to the plate only at a single location or in a plurality of different locations, which makes the structure more versatile. By providing bolt-accommodating bores at different locations on the plate, the fixed hub part can be selectively mounted at different locations. In one form, the pin is accommodated by a single bore with the fixed hub part mounted in each of two different locations. This simplifies manufacture and avoids further weakening of the frame plate.

Further according to the invention, a hub assembly is provided for supporting an agricultural wheel for rotation relative to the frame. The hub assembly has a support for an agricultural wheel to be rotated about a first axis relative to a frame, with the support including a mounting plate to which an agricultural wheel can be connected. There is a fixed hub part, with the wheel support being connected to the fixed hub part for rotation about the first axis. The fixed hub part is connectable to a frame and has a first surface to abut a frame surface with the fixed frame part drawn against a frame surface. In this form, no part of the structure for connecting the fixed hub part extends into a non-circular bore in the frame to which the subassembly is to be mounted.

The invention further contemplates a hub assembly for supporting an agricultural wheel for rotation relative to a frame, with the hub assembly having a support for an agricultural wheel to be rotated about a first axis relative to a frame and the support including a mounting plate to which an agricultural wheel can be connected. A fixed hub part is provided with there being first structure for connecting the wheel support to the fixed hub part for rotation about the first axis. Second structure is provided for connecting the fixed hub part to a frame relative to which the agricultural wheel is to be rotated. The second structure includes structure offset from the first axis cooperating between the fixed hub part and a frame for preventing rotation of the fixed hub part relative to a frame about the first axis.

The invention contemplates this structure in combination with an agricultural wheel that is removably connectable to the mounting plate.

The agricultural wheel can take a number of different forms. In one form, it has a central hub and a plurality of teeth projecting in cantilever fashion radially from the central hub.

The invention contemplates the above structure in combination with a frame having a plate to which the fixed hub part is abutted with the hub assembly in an operative position.

While the frame can take any of a number of different forms, it may have first and second plates with first and second flat surfaces that are angularly oriented with respect to each other. The fixed hub part is abuttable selectively to either of the first and second flat surfaces. This allows tandem mounting of wheels and other structures.

A pin and bore connection can be used to prevent relative rotation between the fixed hub part and frame. The pin is extendable into the bore by effecting relative axial movement between the frame and fixed hub part.

BRIEF DESCRIPTION OF THE DRAWINGS

FIG. 1 is a side elevation view of a planting unit with a soil working attachment, including two rotary wheels, mounted to a frame according to the present invention;

FIG. 2 is a perspective view of two rotary wheels mounted to a frame part according to the prior art;

FIG. 3 is an enlarged, exploded perspective view of the frame part in FIG. 2 and a hub assembly for supporting one of the wheels;

FIG. 8 is a fragmentary, perspective view of the lower portion of the frame part in FIG. 7;

FIG. 9 is a rear elevation view of the inventive hub assembly in FIG. 7;

FIG. 10 is a plan view of the hub assembly operatively connected to the frame part in FIGS. 7 and 8 according to the invention;

FIG. 11 is a view as in FIG. 10 with a modified form of connection between a frame part and hub assembly, according to the present invention;

FIG. 12 is a schematic plan representation of two rotary wheels, such as those in FIGS. 1 and 2, placed in staggered relationship on the inventive frame part;

FIG. 13 is a schematic plan representation as in FIG. 12 of two wheels mounted according to the present invention in meshing relationship.

DETAILED DESCRIPTION OF THE DRAWINGS

Figure 4:
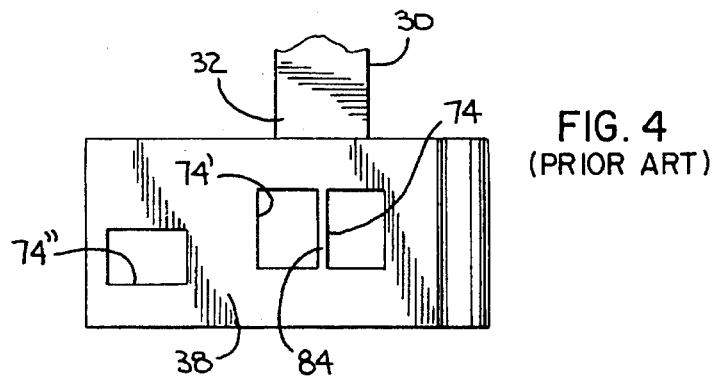
FIG. 4 is an enlarged, fragmentary, perspective view of the lower portion of the prior art frame part.

FIG. 1 shows an exemplary environment for the present invention. The present invention is shown in FIG. 1 as used to connect two identical agricultural wheels 10, 12 to a frame 14 on a planting unit 16. The planting unit 16 has wheels 18 to permit it to be readily navigated through a field.

The planting unit 16 is advanced by a towing vehicle 20, typically a tractor. The towing vehicle 20 connects to a main frame 22, to which one or more of the planting units 16 can be attached for simultaneous passage through a field.

A four bar linkage 24 acts between the main frame 22 and the planting unit frame 14 to allow the planting unit 16 to move vertically relative to the main frame 22 in response to a change in the contour of the terrain over which it is drawn.

The wheels 10, 12, shown in FIG. 1, are just exemplary of one type of rotating member which can be mounted to a frame using the inventive concept. The wheels 10, 12 shown are of the type currently being sold by the assignee herein under the trademark TRASHWHEEL™.

One suitable connection for similar type wheels is shown in the system in my U.S. Pat. No. 5,129,282. In that system, the wheels are attached to a vertically extending stem on a frame, with the stem being selectively adjustable in a vertical direction to permit controlled selection of the operating depth for the wheels.

A multitude of different connections can be devised between a vertical stem and the remainder of the frame. The present invention is not focused on that particular connection but rather on the connection, in this case, between the wheels 10, 12 and any like functioning stem 26 that is part of the implement frame 22.

Figure 6:
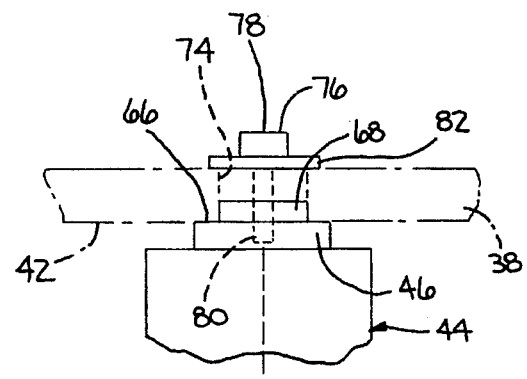
FIG. 6 is an enlarged, fragmentary, plan view of the hub assembly operatively connected to the frame part in FIGS. 2–4.
Figure 5:
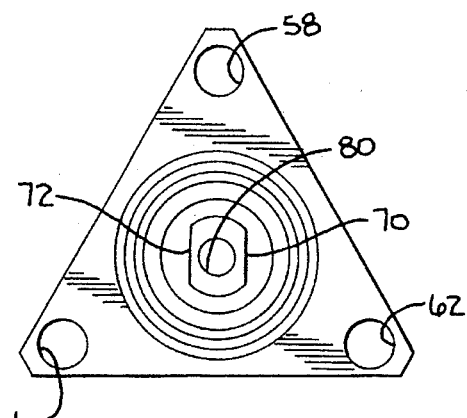
FIG. 5 is an enlarged, rear elevation view of the hub assembly in FIGS. 2 and 3.

More specifically, the invention is directed to the connection of a hub assembly at 28 to the frame stem 26, with each hub assembly 28 being configured to removably accept one of the wheels 10, 12 for rotation. Before the inventive structure is described, the prior art structures in FIGS. 2–6 will be described, along with the associated problems that have heretofore been contended with.

The prior art frame stem 30 has an upright element 32. At the bottom of the upright element 30, a V-shaped plate assembly 34 is connected. The plate assembly 34 has first and second plates 36, 38 having flat surfaces 40, 42, respectively, which together make an acute angle α with each other.

A hub assembly at 44 is provided to support one wheel 10, 12. As explained more fully below, each plate 36, 38 is configured to support the hub assembly 44 in one of three different positions on the plates 36, 38. The ability to mount the hub assembly in different positions on the plates 36, 38 allows the wheels 10, 12 to be mounted in different relative positions. For example, in one mounting position, as shown schematically in FIG. 13, the paths of the wheels 10, 12 coincide so that the wheels 10, 12 are in mesh. Alternatively, as shown in FIG. 12, one wheel 12 can be staggered from the other wheel 10.

Since the mounting of the hub assembly 44 to each of the plates 36, 38 is the same, the discussion herein will be limited to the representative mounting of the hub assembly 44 to the exemplary plate 38. The hub assembly 44 has a fixed, cylindrical part 46 which attaches directly to the plate 38. A wheel support member 48 is attached to the fixed hub part 46 in a manner that is known to those skilled in the art for rotation relative to the fixed hub part 46 about an axis 50, using an appropriate bearing (not shown). The wheel support member 48 includes a truncated triangular plate 52 with an axially projecting flange 54 to pass through a central opening 56 in the wheels 10, 12. The plate 52 has three equidistantly spaced bores 58, 60, 62 to accommodate bolts 64 that are used to removably secure the wheels 10, 12 to the plate 52.

The fixed hub part 46 has an axially facing, flat surface 66 to facially abut the plate surface 42 with the hub assembly in operative position on the frame stem 30.

To prevent relative rotation between the hub assembly 44 and plate 38, a reduced diameter, axially projecting boss 68 is provided on the fixed hub part 46. The boss has two diametrically opposite flats 70, 72 to make keyed connection within a correspondingly-shaped bore 74 through the plate 38.

The surface 66 on the hub assembly 44 is drawn against the plate surface 42 by a bolt 76 with an enlarged head 78. The bolt is 76 threaded into a blind bore 80 in the hub assembly 44. The enlarged head 78 bears against a washer 82 so that the plate 38 is captively held between the washer 82 and the hub surface 66. The washer 82 must be larger than the bore 74 to prevent inadvertent passage of the washer 82 and bolt 76 through the bore 74.

The bore 74 must be made substantially rectangular to accommodate the boss 68. Since the rectangular bore 74 cannot be drilled, the plate 38 must be stamped or ground to form the bore 74. In the event that the plate 38 has a thickness T that is greater than ½ inch, stamping is not a feasible manufacturing method. Consequently, there is a built in limitation on the permissible thickness for the plate 38.

Another problem in the prior art is that the bore 74 requires a large washer 82 or a similarly sized head 78 on the bolt 76 to avoid inadvertent passage thereof through the bore 74. The need for a separate washer 82 complicates the assembly process.

A still further problem is introduced by the additional bores 74', 74" provided to allow alternative positioning of the hub assembly 44 on the plate 38. In this case a thin dividing wall 84 resides between the bores 74, 74'. The wall 84 is relatively thin which creates a weakening in the plate 38.

In spite of the inherent drawbacks with the prior art structure, for want of a better solution, no suitable alternative structures have been developed until the present invention.

Figure 7:
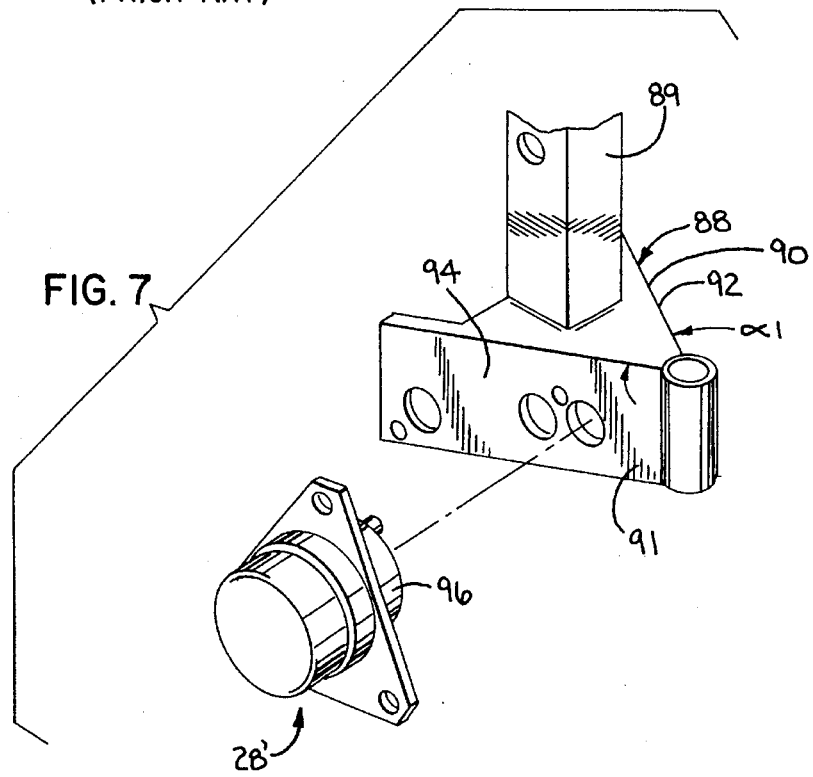
FIG. 7 is a fragmentary, exploded, perspective view of a frame part and hub assembly according to the present invention.

The inventive structure is shown in FIGS. 7–11 and consists of a hub assembly 28' for connection to a frame stem 88 having an upright element 89 and transverse plates 90, 91 with flat surfaces 92, 94 making an acute angle oil with each other.

The hub assembly 28' has a fixed hub part 96 and a wheel support plate 98 carried on a sleeve 100 for rotation about an axis 101 relative to the fixed hub part 96. The fixed hub part 96 has an axially facing surface 104 to facially abut one of the plate surfaces 92, 94 with the hub assembly 28' in its operative position on the frame stem 88. Since the hub assembly 28' mounts to both of the plates 90, 91 in the same fashion, the description herein will be limited to the connection of the hub assembly 28' to the mounting plate 91.

A bolt 108, or other suitable fastener, is passed inside out through a bore 110 in the plate 91 into a mating, blind bore 112 in the fixed hub part 96. The plate 91 is thus captively held between an enlarged head 114 on the bolt 108 and the surface 104 of the fixed hub part 96.

Since the bore 110 need have a diameter only slightly larger than the shank 116 of the bolt 108, the head 114 will be blocked from passage through the bore 110 so that the need for a washer is obviated.

To prevent relative rotation between the hub assembly 28' and the plate 91, a pin 118 is provided on the fixed hub part τto project axially into a bore 120 in the plate 91 spaced from the bore 110. By effecting relative axial movement of the plate 91 and hub assembly 28' towards each other, the pin 118 can be directed into the bore 120. By then pivoting the hub assembly 28', the bore 110 in the plate 91 can be aligned with the bore 112 in the hub assembly 28' to allow the bolt 108 to be passed through the bore 110 and threaded into the bore 112 from the inside of the plate 91.

It can be seen that both of the bores 110, 120 are circular and thus can be formed by drilling. Consequently, the formation of the bores 110, 120 can be simply and inexpensively accomplished, regardless of the thickness of the plate 91. For example a ½ inch thick plate 91 is desirable for its rigidity and can be drilled but not practically stamped.

The bore 110 has a smaller diameter than the corresponding bore 74 in the prior art structure, previously described, by reason of the fact that the bore 110 need only accommodate the bolt shank 116, whereas the bore 74 in the prior art must accommodate the enlarged boss 68. Consequently, by reason of using a smaller bore 110, the integrity of the plate 91 is maintained.

Spaced bores 110', 110" are provided in the plate 91 to allow the hub assembly 28' to be mounted in two different mounting positions on the plate 91. The bore 110' is situated so that the pin receiving bore 120 can also accommodate the pin 118 with the bolt 108 extended through the bore 110' into the hub assembly 28'. By obviating the need for a separate pin receiving bore, the manufacture of the frame stem 88 is simplified while maintaining the integrity thereof.

A separate pin receiving bore 120" is preferably provided in association with the bore 110".

Once the hub assembly 28' is bolted in place, a wheel 10, 12 can be attached to the hub assembly 28'. The wheel 10, 12 fits over an annular rim 124 and is secured as by bolts 126 to a triangular wheel support member 128. The wheel support member 128 has three through bores 130, 132, 134 to accept a like number of bolts 126.

With the inventive structure, assembly can be carded out more conveniently than with the prior art structure described in FIGS. 2–5 in that the washer 82 can be eliminated. The end user is afforded the same flexibility in placing the wheels 10, 12 in the different relative positions, such as the two positions shown in FIGS. 12 and 13.

A slightly modified form of fixed hub part 136, according to the invention, is shown in FIG. 11. The hub part 136 has a boss 138 that extends partially into the plate 91. The boss 138 can have a circular or non-circular shape. With the circular shape, the boss 138 gives added rigidity to the connection of the hub assembly 28" in FIG. 11 while permitting drilling of the blind bore 140 that accommodates the boss 138. A separate pin 142 extends into a bore 144 in the plate 91 the same as in the previously described embodiment. The pin 142, as well as the pin 118, can extend either fully through the plate 91 or partially axially therethrough, as shown in FIGS. 10 and 11.

The foregoing disclosure of specific embodiments is intended to be illustrative of the broad concepts comprehended by the invention.

I claim:

1. A hub assembly for mounting a member for rotation relative to a frame, said hub assembly comprising:

a support for the member;

a fixed hub part;

first means for connecting the member support to the fixed hub part for rotation relative thereto about a first axis; and second means for connecting the fixed hub part fixedly to the frame relative to which the member is to be rotated, said second means comprising a first surface on the fixed hub part to abut a surface on the frame and a pin on one of the frame and the fixed hub part to project into a first bore on the other of the frame and the fixed hub part to prevent rotation of the fixed hub part around the first axis relative to the frame with the first surface abutted to the frame surface, said pin being movable into the first bore by translatory movement of the pin in a direction parallel to the first axis, said pin and bore being offset from the first axis, said second means further including third means for drawing the first surface on the fixed hub part against the frame surface.

2. The hub assembly for mounting a member for rotation relative to a frame according to claim 1 wherein the first surface on the fixed hub part faces axially in a first direction relative to the first axis, the pin is on the fixed hub part and projects axially in the first direction beyond the first surface on the fixed hub part, and there is one and only one pin on the fixed hub part.

3. The hub assembly for mounting a member for rotation relative to a frame according to claim 1 wherein the third means comprises a bolt with an enlarged head and a threaded bore on the fixed hub part for threadably receiving the bolt, whereby the frame to which the hub assembly is attached can be captively held between the bolt head and the first surface on the fixed hub part, said threaded bore on the fixed hub part having an axis that is substantially coaxial with the first axis.

4. The hub assembly for mounting a member for rotation relative to a frame according to claim 1 in combination with a frame having a plate to which the fixed hub part is abutted with the hub assembly in an operative position on the frame, said second means including means on the frame plate for connecting the fixed hub part to a plurality of different locations on the frame plate at a plurality of different locations.

5. The hub assembly for mounting a member for rotation relative to a frame according to claim 4 wherein the first bore is in the frame plate and there is a second bore in the frame plate spaced from the first bore to accommodate the third means.

6. The hub assembly for mounting a member for rotation relative to a frame according to claim 1 in combination with the frame having a plate, said frame plate having a flat, axially facing surface, to which the first surface on the fixed hub part abuts with the hub assembly in an operative position on the frame, there being no part on the fixed hub part other than said pin that extends into the frame plate.

7. The hub assembly for mounting a member for rotation relative to a frame according to claim 1 in combination with the frame having a plate, said frame plate having a flat, axially facing surface to which the first surface on the fixed hub part abuts with the hub assembly in an operative position on the frame, there being a boss on the fixed hub part that is separate from the pin, said boss extending into the frame plate.

8. The hub assembly for mounting a member for rotation relative to a frame according to claim 7 wherein the plate has the third bore into which the boss extends, said third bore being circular in cross section.

9. The hub assembly for mounting a member for rotation relative to a frame according to claim 1 in combination with the frame having a plate with an axially facing surface, said second means includes second and third bores in the frame plate to accommodate a bolt that is extendable through either of the second and third bores and into the fixed hub part to draw the fixed hub part against the plate surface with the hub assembly in each of two different operative positions on the frame.

10. The hub assembly for mounting a member for rotation relative to a frame according to claim 9 in combination with the bolt wherein the first bore accommodates the pin with the bolt extending through either of the second and third bores and into the threaded bore in the fixed hub part.

11. A hub assembly for mounting an agricultural wheel for rotation relative to a frame, said hub assembly comprising:

a support for an agricultural wheel, said support including a mounting plate to which an agricultural wheel can be connected;

a fixed hub part;

first means for connecting the wheel support to the fixed hub part for rotation relative thereto about a first axis; and second means for connecting the fixed hub part fixedly to the frame relative to which the agricultural wheel is to be rotated, said second means comprising a first surface on the fixed hub part to abut a surface on the frame and third means for drawing the first surface on the fixed hub part against the frame surface, said third means comprising a bolt with an axis that is substantially coaxial with the first axis, said second means including means in addition to the third means cooperating between the fixed hub part and frame for preventing relative rotation between the fixed hub part and frame around the first axis, there being no part of said second means on the fixed hub part to be extended into a non-circular bore in the frame to which the hub assembly is to be mounted.

12. The hub assembly for mounting an agricultural wheel for rotation relative to a frame according to claim 11 in combination with the frame, whereby any bore in the frame to accommodate the second means can be formed by drilling.

13. A hub assembly for mounting an agricultural wheel for rotation relative to a frame, said hub assembly comprising:

a support for an agricultural wheel, said support including a mounting plate to which an agricultural wheel can be connected;

a fixed hub part;

first means for connecting the wheel support to the fixed hub part for rotation relative thereto about said first axis; and second means for connecting the fixed hub part fixedly to the frame relative to which the agricultural wheel is to be rotated, said second means including a bolt to draw the fixed hub part against the frame, said bolt having an axis that is substantially coaxial with the first axis, said second means including means offset from the first axis cooperating between the fixed hub part and the frame for preventing rotation of the fixed hub part relative to the frame about the first axis.

14. The hub assembly for mounting an agricultural wheel for rotation relative to a frame according to claim 13 in combination with an agricultural wheel with there being means for removably connecting the agricultural wheel to the mounting plate.

15. The hub assembly for mounting an agricultural wheel for rotation relative to a frame according to claim 14 wherein the agricultural wheel has a central hub and a plurality of teeth projecting in cantilever fashion radially from the central hub on the agricultural wheel.

16. The hub assembly for mounting an agricultural wheel for rotation relative to a frame according to claim 13 in combination with the frame having a plate to which the fixed hub part is abutted with the hub assembly in an operative position on the frame, said second means including means on the frame plate for connecting the fixed hub part to the frame plate at a plurality of different locations.

17. The hub assembly for mounting an agricultural wheel for rotation relative to a frame according to claim 13 in combination with the frame having a plate wherein the second means further includes a first surface on the fixed hub part to abut to the frame plate and the bolt draws the first surface on the fixed hub part against the frame plate to maintain the hub assembly in an operative position on the frame.

18. The hub assembly for mounting an agricultural wheel for rotation relative to a frame according to claim 17 wherein the frame has first and second plates with first and second flat surfaces that are angularly oriented with respect to each other, said first surface on the fixed hub part being abuttable selectively to the first and second flat surface on the frame plates with the hub assembly in an operative position on the frame.

19. The hub assembly for mounting an agricultural wheel for rotation relative to a frame according to claim 13 in combination with a frame wherein the second means comprising a pin on the one of the frame and fixed hub part to project into a first bore on the other of the frame and fixed hub part.

20. The hub assembly for mounting an agricultural wheel for rotation relative to a frame according to claim 19 wherein the pin on the one of the frame and fixed hub part is extendable into the first bore by effecting relative axial movement between the frame and the fixed hub part.

* * * * *